(No Model.) 2 Sheets—Sheet 2.
D. MANUEL.
HARROW.
No. 584,734. Patented June 15, 1897.
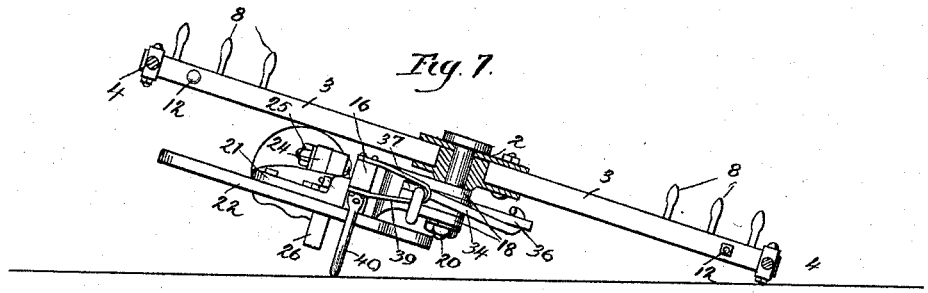
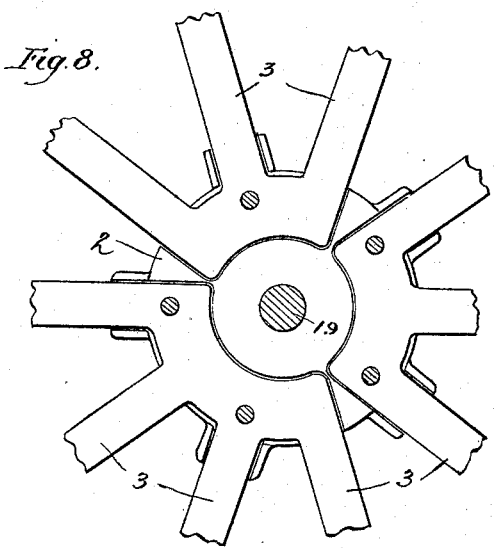
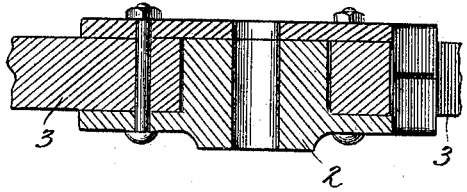
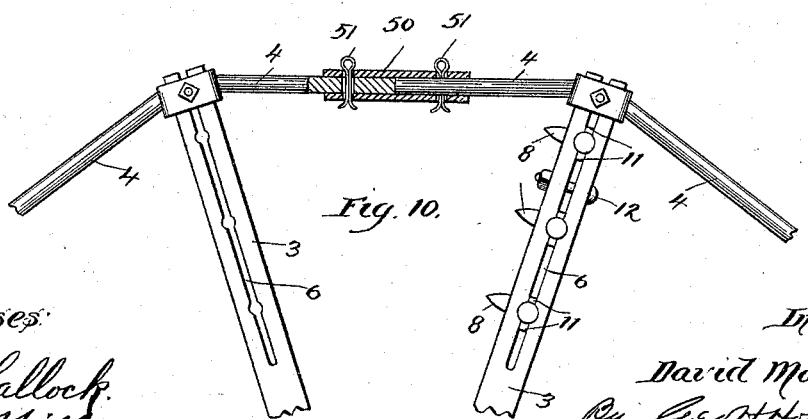
Witnesses:
H. B. Hallock.
S. J. Williamson.
Inventor:
David Manuel
By Geo. H. Holgate
Attorney
THE NORRIS PETERS CO., PHOTO-LITHO., WASHINGTON, D. C.

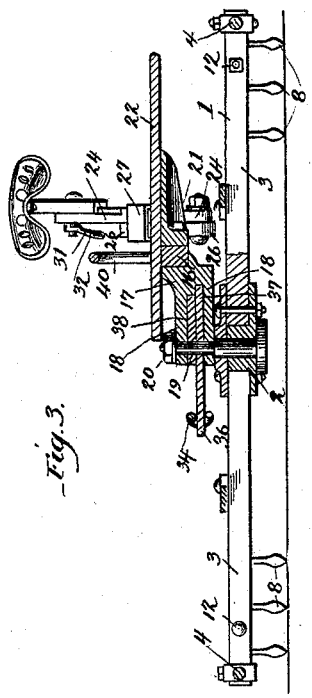

UNITED STATES PATENT OFFICE.

DAVID MANUEL, OF HYDE PARK, MASSACHUSETTS, ASSIGNOR OF ONE-HALF TO H. A. STODDARD, OF SAME PLACE.

HARROW.

SPECIFICATION forming part of Letters Patent No. 584,734, dated June 15, 1897.

Application filed April 17, 1896. Serial No. 588,018. (No model.)

*To all whom it may concern:*

Be it known that I, DAVID MANUEL, a citizen of the United States, residing at Hyde Park, in the county of Norfolk and State of Massachusetts, have invented certain new and useful Improvements in Harrows, of which the following is a specification.

This invention relates to rotary harrows of that class employing a single wheel, and has for its object to provide a simple, cheap, and efficient harrow of the class described. In accordance with this invention the wheel referred to is provided on its under side with depending teeth, preferably of a novel construction, as will be described, and has pivotally secured to its upper side a main draw-bar located at one side of the center of the wheel, and to which is secured a preferably extensible and pivoted seat-post, a platform or foot-rest, and a runner or shoe to bear upon the ground when the harrow is inverted, which shoe supports the center of the wheel above the ground when inverted and facilitates travel of the harrow when not in use, as will be described. These and other features of this invention will be pointed out in the claims at the end of this specification.

Figure 1 is a side elevation of a single-wheel harrow embodying this invention; Fig. 2, a top or plan view of the harrow shown in Fig. 1; Fig. 3, a section of the harrow on the line $xx$ of Fig. 2, looking toward the right; Fig. 4, a side elevation of the harrow inverted, with the wheel shown in a horizontal position to more clearly illustrate the purpose of the shoe or runner; Figs. 5 and 6, detailed perspectives, on an enlarged scale, of the harrow-tooth preferred by me; Fig. 7, a section of the harrow shown in Fig. 2 on the line $xx$, but inverted; Fig. 8, a detailed plan of the hub of the wheel, showing the mode of securing the three sections thereof together; Fig. 9, a section of this hub; and Fig. 10, a detailed broken-away view of a portion of the periphery of the wheel, illustrating the manner in which the sections are secured together on their circumference.

The harrow herein shown consists of a single wheel 1, composed of a center hub 2, spokes or arms 3, radiating therefrom, and a perimeter or felly composed of tubes or rods 4, which connect the outer ends of the arms by being threaded into suitable couplings 5, or it may be made in any other suitable manner.

The spokes or arms 3 are split or divided at the outer portions thereof, as at 6, and are provided with round holes, into which extend the shanks 7 of harrow-teeth 8, the said shanks being provided on their front and rear sides or surfaces with oppositely-inclined notches or serrations 9 and 10, which extend into the circular portion of the hole in each part of the split arm, the said shank further having the side ribs 11, which project into the slot 6 to prevent the turning of the tooth.

The shanks of the teeth are clamped in their holes or sockets by screws or bolts 12, extended through the split portion of the spokes or arms, and the notches or serrations 9 and 10 prevent vertical movement or displacement of the teeth and are assisted by a shoulder 13 on the rear side of the tooth, formed by a curved back web 14, the said web merging at its lower end with the front face or portion 15 of the tooth, which front portion is widened, as shown in Fig. 5. This construction of harrow-tooth enables the teeth to be more securely fastened in the slotted spokes or arms. The teeth 8 depend from the under side of the spokes or arms 3 and are of substantially uniform length to rest upon the ground in the normal position of the harrow.

The wheel 1 has secured to its upper surface a main draw-bar 16, which is located to one side of the center of the wheel and which is pivotally mounted, preferably as herein shown, by means of a casting or yoke 17, provided with the arms 18, which are mounted to turn upon a center pivot or stud 19, firmly secured to the hub 2 of the wheel in any suitable or desired manner, the casting or yoke 17 being detachably secured on the said stud or pivot 19 by means of a suitable nut 20.

The draw-bar 16 is preferably widened at its center portion, which is accomplished, as herein shown, by securing to the said bar a second bar 21, (see Figs. 1 and 3,) the bar 21 being secured to the main bar 16 by suitable bolts, or the said bar 21 may be made as an integral part of the main draw-bar. The main draw-bar 16 has secured to its upper surface a platform 22, provided, as herein shown, with a foot-rest 23, the said platform extending substantially at right angles to the main draw-bar. The main draw-bar, in accordance with this invention, carries a seat-post 24, which is pivoted at its lower end, as at 25, to a bracket or post 26, rigidly secured to the side of the draw-bar, and for the best results extending above the same. The seat-post 24 is adapted to be secured in a substantially vertical or upright position to the post 26 by means of a sliding collar 27, fitted upon the seat-post 24 and adapted to be fitted over the upper end or portion of the stationary post 26 when it is desired to secure the seat-post in a substantially vertical or upright position, but which collar is adapted to be moved longitudinally on the seat-post and to be disengaged from the stationary post 26, so as to permit the seat-post 24 to be turned on its pivot down into a substantially horizontal position (indicated by dotted lines) when it is not desired to use the harrow. The seat-post 24 in its substantially horizontal position may and preferably will be supported above and out of contact with the wheel 1 by means of a horizontal projecting bracket 28, secured to and extended from the rear end of the main draw-bar 16, the said seat-post being adapted to be fastened to the said bracket in any suitable or desired manner, as by a rope or chain. (Not herein shown.)

In order to permit the harrow to be operated by persons of different heights—as, for instance, by a full-grown man at one time and by a boy at another time—I prefer to provide the seat-post 24 with an adjustable extension 29, which is adapted to slide longitudinally on the seat-post 24 and to be firmly clamped in any desired or adjusted position by means of a bolt 30, extended through the extension 29 and the seat-post 24 and provided at its opposite end with a locking-nut 31, which may and preferably will be provided with a suitable handle 32, the bolt 30 being extended through a vertical slot 33, which permits of the adjustment of the extension and seat.

In order to obtain a direct or central pull when the harrow is in operation, an auxiliary or check draw-bar 34 is employed, which in the present instance is represented as a metallic rod fastened at its rear end to one arm 35 of a lever 36, pivotally mounted upon the stud or pivot 19, between the forked arms 18, the lever 36 having its other arm 37 extended between the forked arms 18 and fixedly secured thereto in any suitable manner. In the present instance the arm 37 of the lever 36 is represented as extended into a recess formed in the casting or yoke 17 and prevented from tipping by means of a removable block or piece 38, (see Fig. 3,) which is pivoted on the stud or pin 19. The arm 35 of the lever 36 extends beyond the pivot-pin or stud 19 a distance substantially equal to the distance of the draw-bar 16 from the said stud or pin, and the check draw-bar 34 is inclined or bent toward the front end of the main draw-bar 16 and secured to the said main draw-bar by a tie piece or bar 39, the said check-bar being suitably formed for attachment to a whiffletree of any suitable or desired construction and preferably that employed with two horses. The main draw-bar 16 has secured to it a runner or shoe 40, preferably made of metal and comprising, as herein shown, a horizontal portion, an inclined portion, and a substantially vertical portion, the said horizontal portion being raised above the main draw-bar to any suitable or desired distance, so that when the harrow is inverted, as represented in Figs. 4 and 7, the platform and the seat will be raised above the ground a sufficient distance to clear ordinary obstructions. The shoe or runner 40 is employed to facilitate travel of the harrow when the latter is not in operation—as, for instance, when going to and returning from the field—and in practice the shoe 40 alone may be used to support the harrow, in which case the wheel 1 would be lifted into a substantially horizontal position (shown in Fig. 4) by the driver, or the wheel may be allowed to tip, so that the rim on the opposite side of the center from the shoe may bear upon the ground, as represented in Fig. 7.

In the construction of the wheel I prefer to form it of three sections, each composed of a series of the arms 3, tied together by means of plates or sockets, and when these three sections are brought together they are secured in their proper relative positions by a top and bottom plate through which pass suitable bolts, as clearly shown in Figs. 8 and 9. The perimeter of the wheel is also divided by dividing one of the tubes 4 in half at the juncture of each of the sections and coupling it together by a slip-socket 50, preferably of tubular shape, into which the divided ends of the tube pass and are there held by cotter-pins 51 or other suitable connections. This arrangement permits of the separation of the wheel into its sections, so as to facilitate its storage or transportation and also to facilitate repairing should one portion of the wheel become injured or worn.

In use my improved harrow is very efficient in disintegrating and leveling the broken ground over which it passes, in that the teeth have a compound action upon said ground, since the draft of the teeth upon one side of the wheel is greater than the draft of the teeth upon the opposite side of the wheel, thus causing the wheel to take up a slow rotary motion while being advanced forward by the team, and this rotary motion causes the teeth not only to act upon the ground in the line of progression but also causes them to act upon the ground convolutely to the rotary movements of the wheel, thus bringing said teeth into contact with and causing them to act upon every portion of the surface over which the harrow passes, so as to thoroughly break and disintegrate the coarser particles or clods of dirt and even the surface thereof.

Having thus fully described my invention, what I claim as new and useful is—

1. In a device of the character described, arms having slots, serrated teeth held therein, each of said teeth having a web merging with the tooth at its lower end and side wings formed on each tooth to fit in the slots, as and for the purpose described.

2. In a single-wheel harrow, the combination of the following instrumentalities, viz: a wheel provided on its under side with teeth or projections, a main draw-bar pivotally secured to the upper surface of the wheel at one side of the center, an extensible seat-post pivoted to the said draw-bar and means to secure the pivoted seat-post in a substantially vertical position, substantially as described.

3. In a device of the character described, arms having slots, teeth provided with webs fitting therein, said webs merging with the teeth at their lower ends and having serrations at their upper ends and side wings formed on each tooth to fit in the slot, as and for the purpose described.

4. In a device of the character described, a harrow-wheel, a main draw-bar having an angular extension to which said wheel is journaled a lever secured to the angular extension, a check draw-bar attached to the lever and connected to the main draw-bar, as and for the purpose described.

In testimony whereof I have hereunto affixed my signature in the presence of two subscribing witnesses.

DAVID MANUEL.

Witnesses:
S. S. WILLIAMSON,
FRANK B. RICH.